United States Patent [19]
Sato et al.

[11] Patent Number: 5,315,458
[45] Date of Patent: May 24, 1994

[54] METHOD AND APPARATUS FOR POSITIONING HEAD ON REFERENCE TRACK OF DISK MEDIUM

[75] Inventors: Atsushi Sato; Kouichi Kusakari, both of Higashine, Japan

[73] Assignee: Fujitsu Limited, Kawasaki, Japan

[21] Appl. No.: 876,419

[22] Filed: Apr. 30, 1992

[30] Foreign Application Priority Data
Apr. 30, 1991 [JP] Japan .................. 3-098507

[51] Int. Cl.$^5$ .......................... G11B 21/08
[52] U.S. Cl. .................. 360/78.08; 318/369; 318/466
[58] Field of Search ............ 360/75, 78.05, 78.06, 360/78.08; 318/256-261, 369, 466-468, 516, 571

[56] References Cited

U.S. PATENT DOCUMENTS

| | | | |
|---|---|---|---|
| 3,132,855 | 7/1992 | Waugh et al. | 360/78.07 |
| 3,798,427 | 3/1974 | Conners | 318/371 |
| 4,651,073 | 3/1987 | Shimizu et al. | 318/369 |
| 4,796,112 | 1/1989 | Mizukami et al. | 360/78.07 |
| 4,937,689 | 6/1990 | Seaver et al. | 360/78.06 |
| 5,003,415 | 3/1991 | Freeze | 360/78.06 |
| 5,050,146 | 9/1991 | Richgels et al. | 360/78.06 |

FOREIGN PATENT DOCUMENTS

| | | |
|---|---|---|
| 63-876 | 1/1988 | Japan . |
| 63-050985 | 3/1988 | Japan . |
| 1021712 | 1/1989 | Japan . |

Primary Examiner—Edward K. Look
Assistant Examiner—Michael S. Lee
Attorney, Agent, or Firm—Staas & Halsey

[57] ABSTRACT

A head is moved toward an IGB1 at high speed until the IGB1 is detected, and then the head is moved toward an IGB2 at low speed until the IGB2 is detected. After the IGB2 is detected, a gradually increasing inverted drive current is fed to a VCM moving the head until an inversion of a direction of movement of the head is detected. After the IGB1 is not detected, a position control of the head is performed to position the head on a reference track. Rapid positioning of the head is attained even though an external force acting on a head actuator carrying the head varies.

8 Claims, 15 Drawing Sheets

34

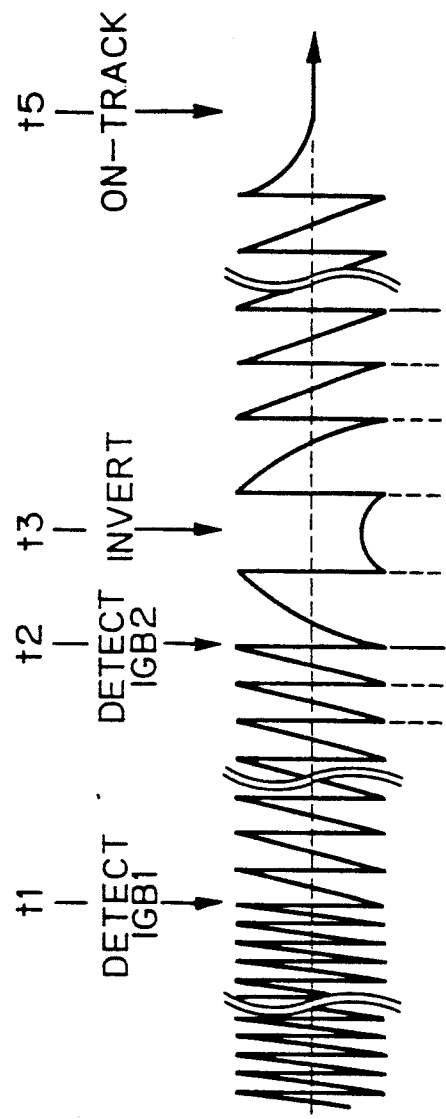
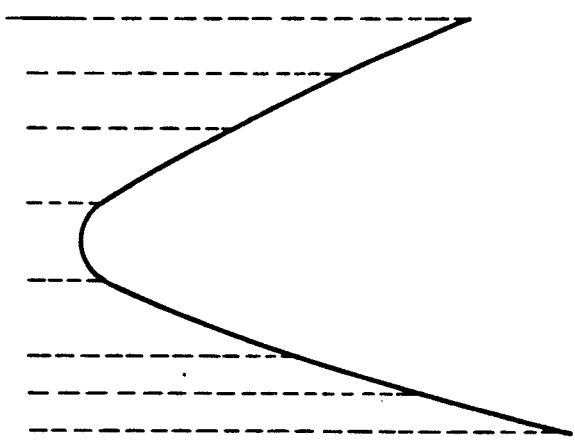
Fig. 16A
Fig. 16B

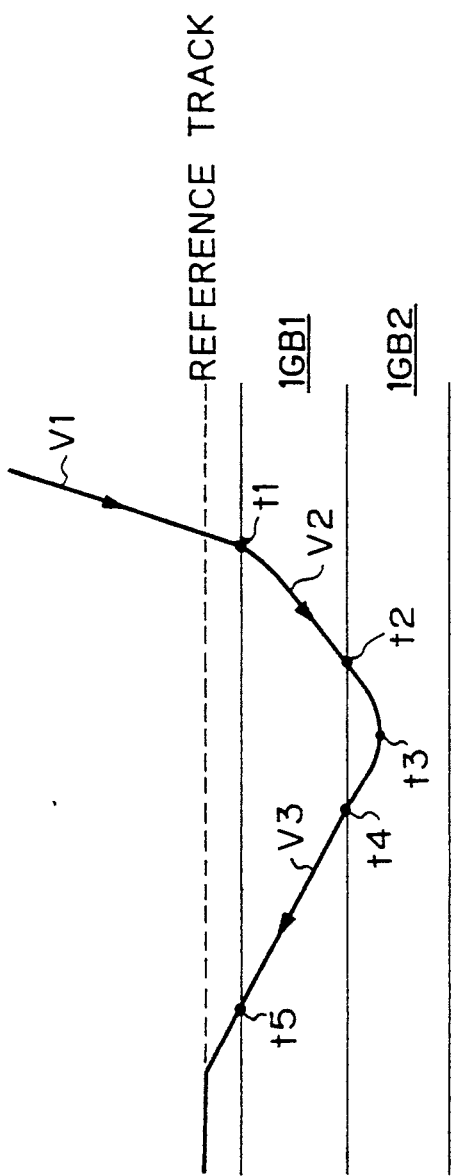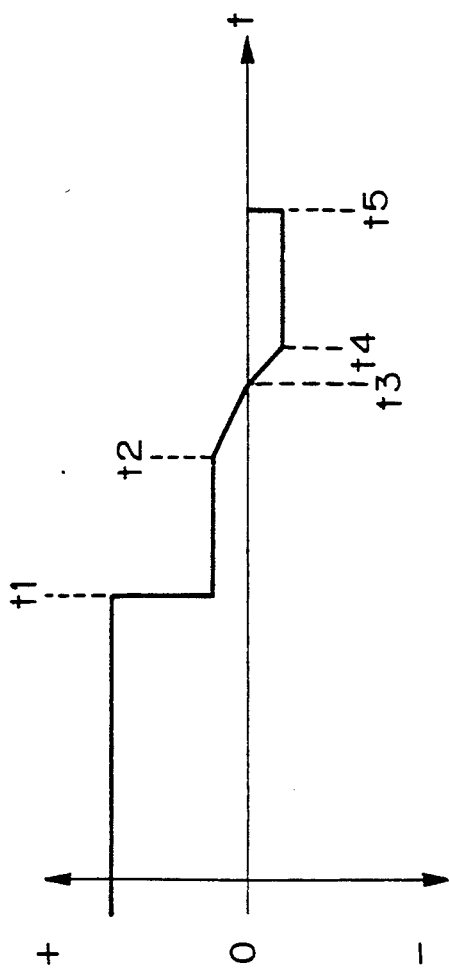
Fig. 17
Fig. 18

METHOD AND APPARATUS FOR POSITIONING HEAD ON REFERENCE TRACK OF DISK MEDIUM

BACKGROUND OF THE INVENTION

Field of the Invention

The present invention relates to a method and apparatus for positioning a head at a position on a predetermined reference track of a disk medium in response to a rezero request, etc. in a disk storage unit.

Description of the Related Art

When a disk storage unit is started up or when an error occurs during a seeking operation, etc., a rezero request is issued, and in response to the rezero request a head is moved to a position on a reference track, which is usually an inside track of a data area of a magnetic disk. Double guard band areas IGB (Inner Guard Band) 1 and IGB2 are provided on the inside of the reference track.

In a conventional method of positioning the head at the reference position, the head on the data area is moved toward the guard band areas at high speed until the IGB1 is detected. If the IGB1 is detected, the speed is switched to low speed. When the IGB2 is detected, the drive current fed to a VCM (Voice Coil Motor) moving the head is inverted. The inverted drive current is fed to the VCM at a predetermined constant level during a predetermined constant time period in order to create an amount of torque sufficient for inverting the direction of the movement of the head. After that, the head is moved toward the data area at constant speed until the IGB1 is not detected, and then the control mode is switched from the speed control to position control, to position the head at the reference position.

The above conventional head positioning method attains high speed positioning without the occurrence of an overshoot or a lag, if the external force acting on a head actuator carrying the head is constant.

However, the external force acting on the head actuator varies depending on the variation in rigidity of an FPC (Flexible Printed Circuit) provided for electrically connecting the head to the drive circuits, depending on the instability of a revolution system, and depending on the external vibration, etc. The variation in rigidity of the FPC is caused by a variation in the ambient temperature. If the external force varies, the inertia of the head actuator varies when the direction of the movement of the head is inverted on the guard band area, and thus torque necessary for inverting the direction of the movement varies. Therefore, although a constant amount of the inverted current is fed, returning the head is late because of lack of inversion torque in some cases, or an overshoot occurs in some cases if the speed of the head is too fast when the head reaches the reference position because the inversion torque is too large. When the overshoot occurs, a lot of time is wasted until the position of the head becomes stable at the reference position.

In a disk storage unit using disks having a small diameter, the length of the arm of the head actuator is also small, and the external force acting on the head actuator becomes relatively large. Therefore, the above problems become more serious in the system using disks having a smaller diameter.

SUMMARY OF THE INVENTION

It is an object of the present invention to provide a method and an apparatus for positioning a head of a disk storage unit at a reference position with reliability and at high speed even though the external force acting on a head actuator varies.

In accordance with the present invention, there is provided a method of positioning a head on a reference track of a disk medium having a first guard band behind the reference track and having a second guard band behind the first guard band, the head being movable by feeding a drive current to a driving motor for the head, comprising the steps of
i) moving the head toward the first guard band at a first speed, until the first guard band is detected;
ii) moving the head toward the second guard band at a second speed lower than the first speed, until the second guard band is detected;
iii) feeding an inverted drive current to the driving motor, until an inversion of a direction of movement of the head is detected;
iv) moving the head toward the reference track at a third speed, until the first guard band is not detected; and
v) positioning the head on the reference track.

In accordance with the present invention, there is also provided an apparatus for positioning a head on a reference track of a disk medium having a first guard band behind the reference track and having a second guard band behind the first guard band; the head being movable by feeding a drive current to a driving motor for the head, comprising
guard band detecting means for detecting the first guard band and the second guard band;
direction detecting means for detecting a direction of movement of the head; and
control means for moving the head toward the first guard band at a first speed until the guard band detecting means detects the first guard band, moving the head toward the second guard band at a second speed lower than the first speed until the guard band detecting means detects the second guard band, feeding an inverted drive current to the driving motor until the direction detecting means detects an inversion of the direction of the movement of the head, moving the head toward the reference track at a third speed until the guard band detecting means does not detect the first guard band, and positioning the head on the reference track.

BRIEF DESCRIPTION OF THE DRAWINGS

FIGS. 16A and 16B are diagrams showing a variation of the position data in the head positioning process of the present invention;

FIG. 17 is a diagram showing a locus of the head in the head positioning process of the present invention; and FIG. 18 is a graph showing a variation of a drive current in the head positioning process of the present invention.

DESCRIPTION OF THE PREFERRED EMBODIMENTS

A disk storage unit has a plurality of magnetic disks fixed on a common rotation axis. One of faces of the magnetic disks serves as a servo face and the other faces serve as data faces. A servo head is provided on the servo face and data heads moving together with the servo head are provided on the data faces.

Figure 1:
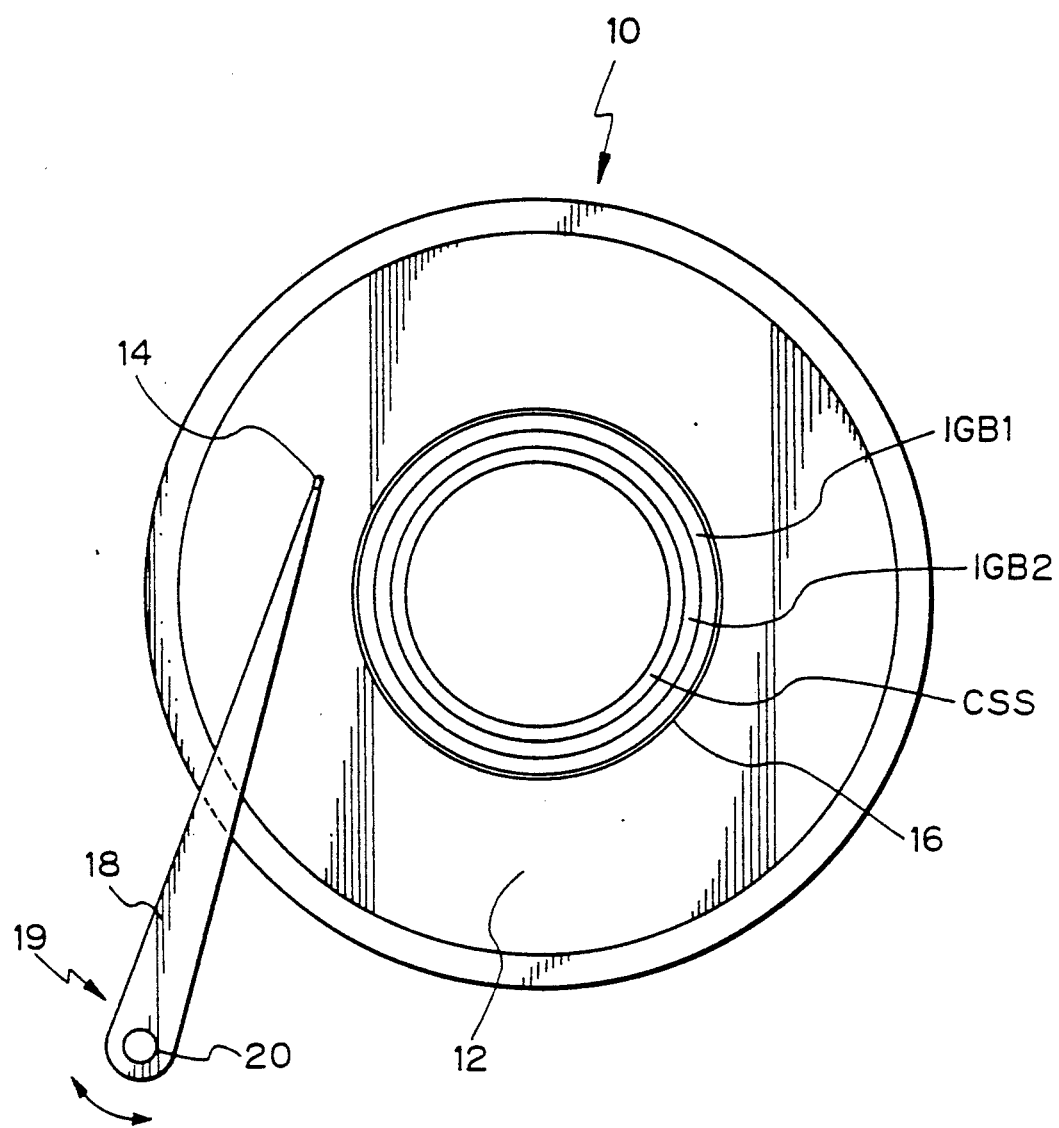
FIG. 1 is a plan view of an example of a servo face of a magnetic disk.

FIG. 1 is a plan view of an example of the servo face 10.

Double guard band areas IGB1 and IGB2 are provided on the inside of a servo zone 12 corresponding to data areas on the data faces (not shown). A CSS (Contact Start Stop) area is provided on the inside of the IGB2. The CSS is provided for placing the heads thereon while rotation of the disks is stopped in order to protect the magnetic information recorded on the faces.

A reference track 16 is settled on the outside of the IGB1 and close to the IGB1. In response to a rezero request issued when starting up or the failure of a seeking operation, the servo head 14 is positioned on the reference track 16 to position the data heads on reference tracks of the data faces.

The servo head 14 is provided on the tip of an arm 18 of a head actuator 19 that is rotated around a shaft 20 so that the servo head 14 is moved across tracks on the face 10. The head actuator 19 is rotated by a voice coil motor (hereinafter referred as VCM).

Figure 2:
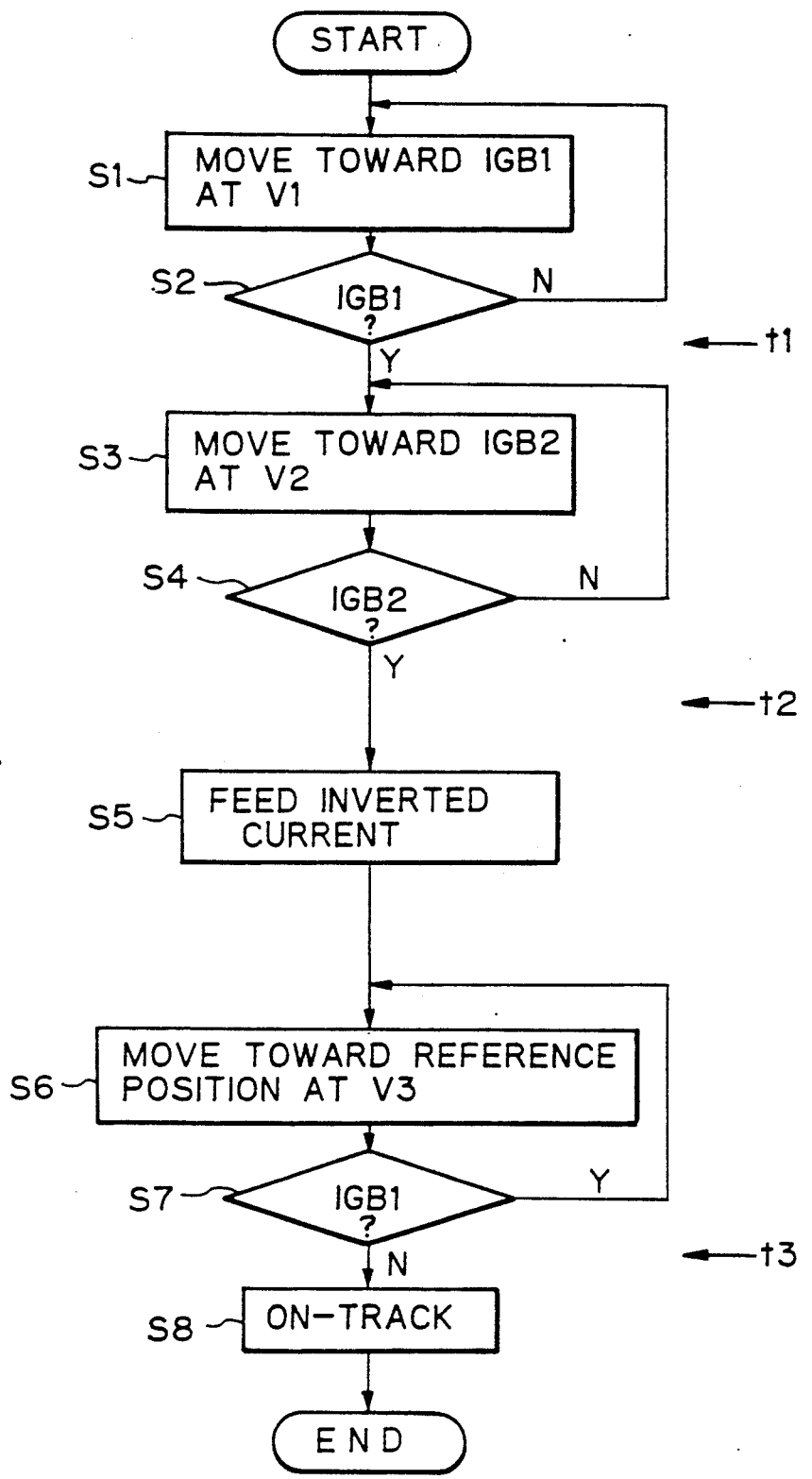
FIG. 2 is a flowchart showing a conventional head positioning method.

FIG. 2 is a flowchart showing a conventional method of positioning the servo head 14 on the reference track 16.

In step S1, the head 14 is moved toward the IGB1 at a controlled constant speed V1. During the movement, in step S2, it is determined whether or not the guard band area IGB1 is detected. If the IGB1 is detected, in step S3, the speed is switched to V2, which is lower than V1 and the head 14 is further moved toward the IGB2.

In step S4, if the IGB2 is detected, in step S5, a drive current flowing through the VCM is inverted and the inverted drive current is fed during a predetermined time period to thereby invert the direction of the movement of the head.

After that, in step S6, the head 14 is moved toward the reference track 16 at a constant speed V3 until the IGB1 is not detected in step S7. If the IGB1 is not detected, a control mode of the head is switched from speed control to position control to position the head 14 on the reference track 16.

Figure 3:
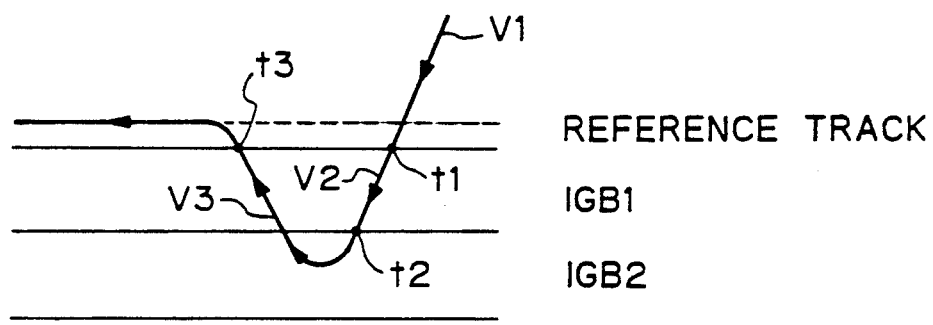
FIG. 3 is a diagram showing a locus of a head in the conventional head positioning method.

FIG. 3 is a diagram showing a locus of the head in a control according to the above conventional head positioning method. In FIG. 3, time t1 to t3 shown in FIG. 2 and speed V1 to V3 are also shown.

Figure 4:
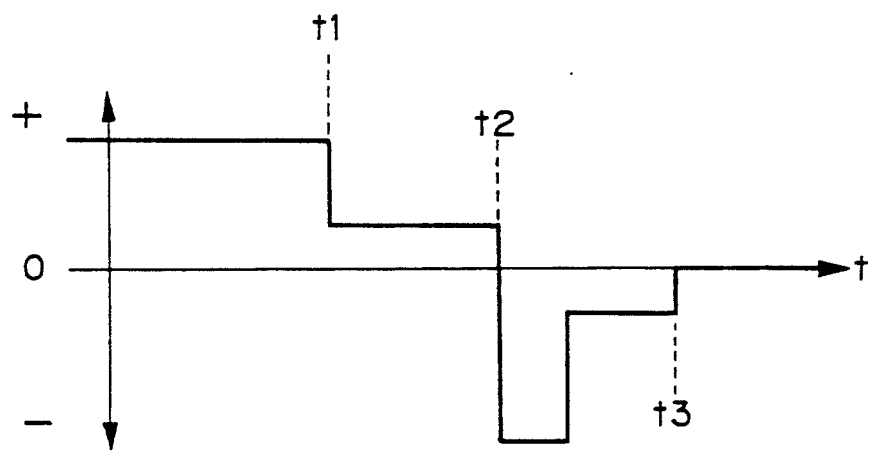
FIG. 4 is a graph showing a variation of a drive current in the conventional head positioning method.

FIG. 4 is a graph showing the variation of the drive current supplied to the VCM, in the time t1 to t3.

Figure 5:
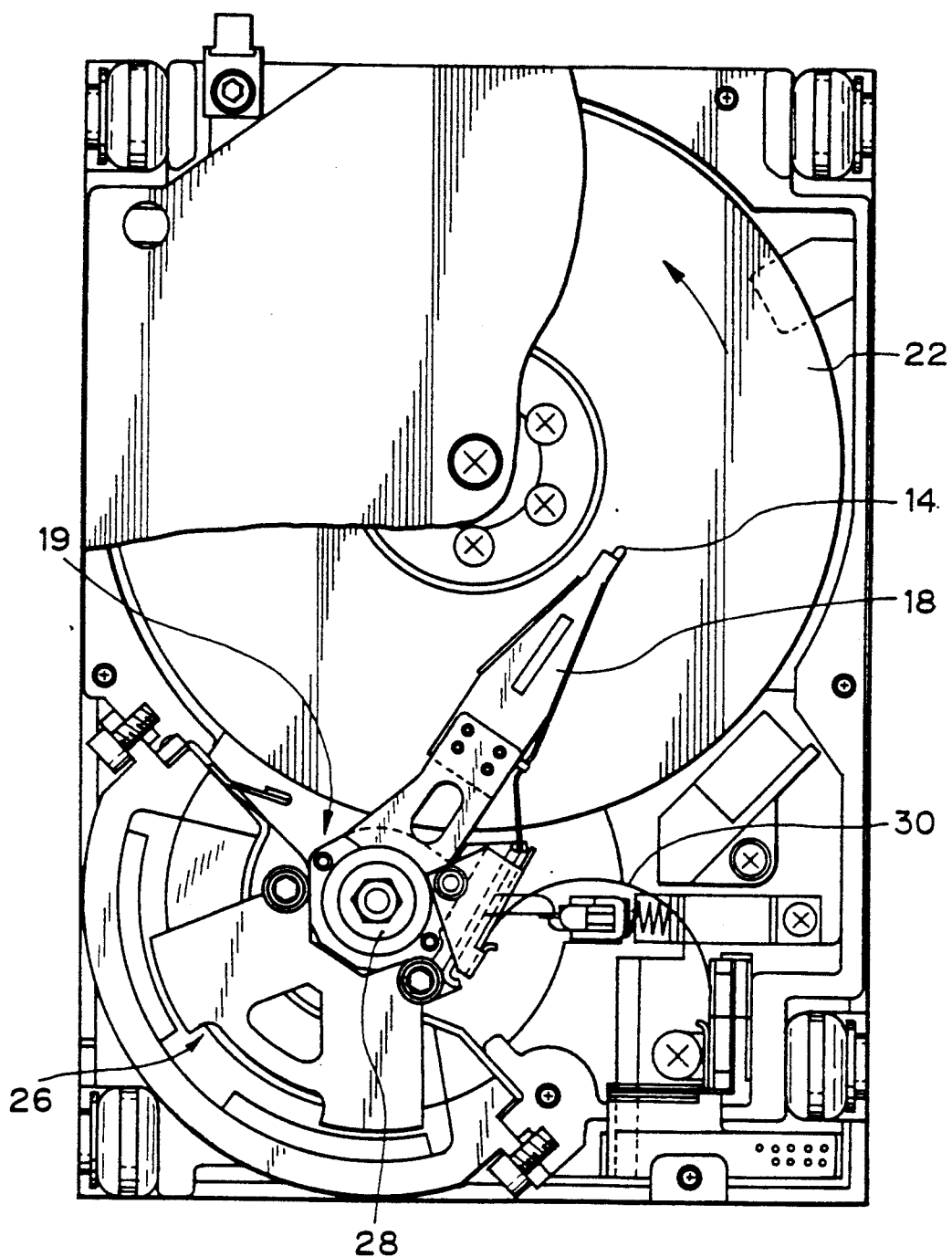
FIG. 5 is fragmentary sectional view of an example of a disk enclosure of a disk storage unit.
Figure 6:
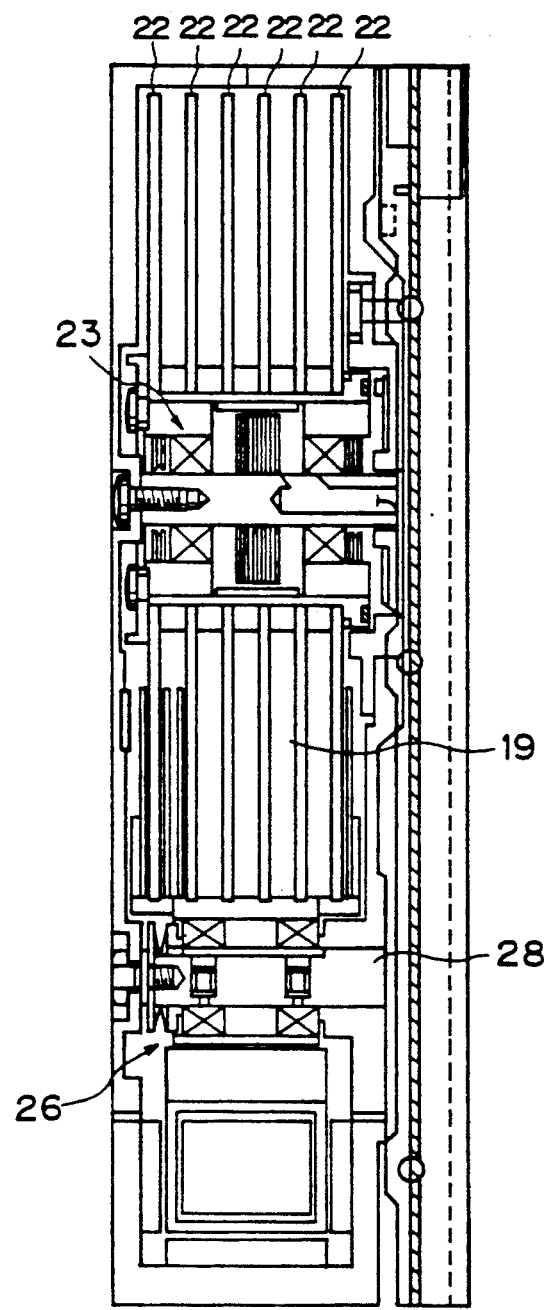
FIG. 6 is a sectional side elevation of the disk enclosure.

FIG. 5 is a fragmentary sectional view of an example of a disk enclosure (DE) of a disk storage unit, and FIG. 6 is a sectional side elevation of the DE.

Referring to FIG. 5 and 6, a plurality of magnetic disks 22 are accommodated in the DE. The magnetic disks 22 are rotated by a spindle motor 23. A head actuator 19 has a head 14 on the tip of its arm 18 and is controlled by a VCM 26 around the shaft 28. An FPC 30 is provided between the head actuator 19 and the fixed drive circuit.

As mentioned previously, the variation in rigidity of the FPC 30 varies the external force acting on the head actuator 19. For this reason, the conventional head positioning method does not always attain high speed positioning.

Figure 7:
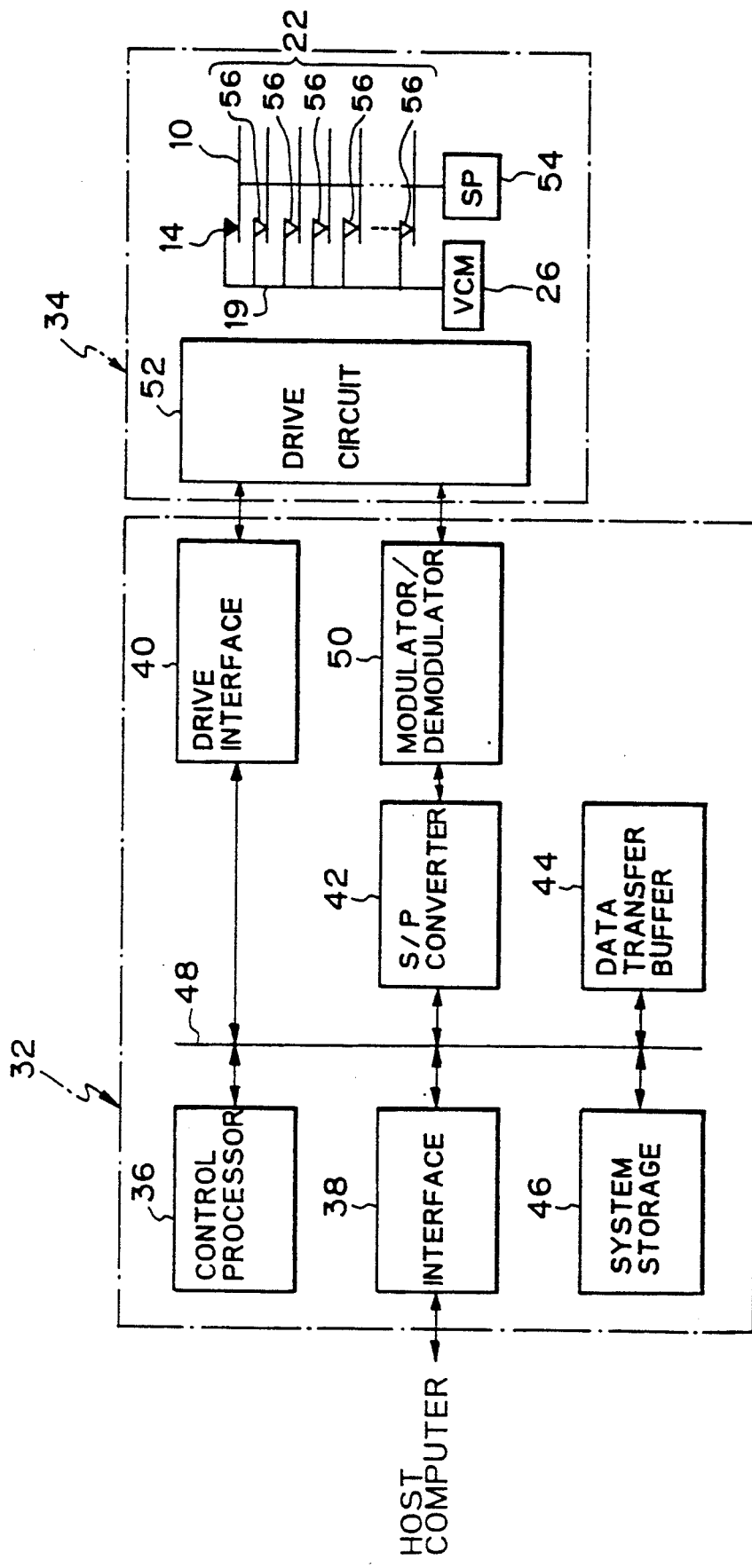
FIG. 7 is a block diagram showing the construction of a disk storage unit according to the present invention.

FIG. 7 is a diagram showing the construction of a disk storage unit according to the present invention. In FIG. 7, the disk storage unit consists of a disk controller 32 and a disk drive 34.

The disk controller 32 comprises a control processor 36 for centrally performing the entire control of the disk storage unit. The disk controller 32 also comprises an interface 38 for communicating with a host computer, a drive interface 40, a serial/parallel converter 42, a data transfer buffer 44, and a system storage 46. These units are connected through an internal bus 48 to the control processor 36. The drive interface 40 transmits control commands from the control processor 36 to the disk drive 34. The host computer communicates write data and read data through the serial/parallel converter 42 and a modulator/demodulator 50 with the disk drive 34. The read data and the write data are temporarily stored in the data transfer buffer 44, and then transmitted to the host computer and the disk drive 34, respectively.

The disk drive 34 comprises a drive circuit 52, a plurality of magnetic disks 22 rotated at a constant rotation speed by a spindle motor 54. The servo head 14 provided on the servo face 10 of the disks 22 and data heads 56 provided on the other faces of the disks 22 are integrally moved across tracks on the faces by the VCM 26.

Figure 8:
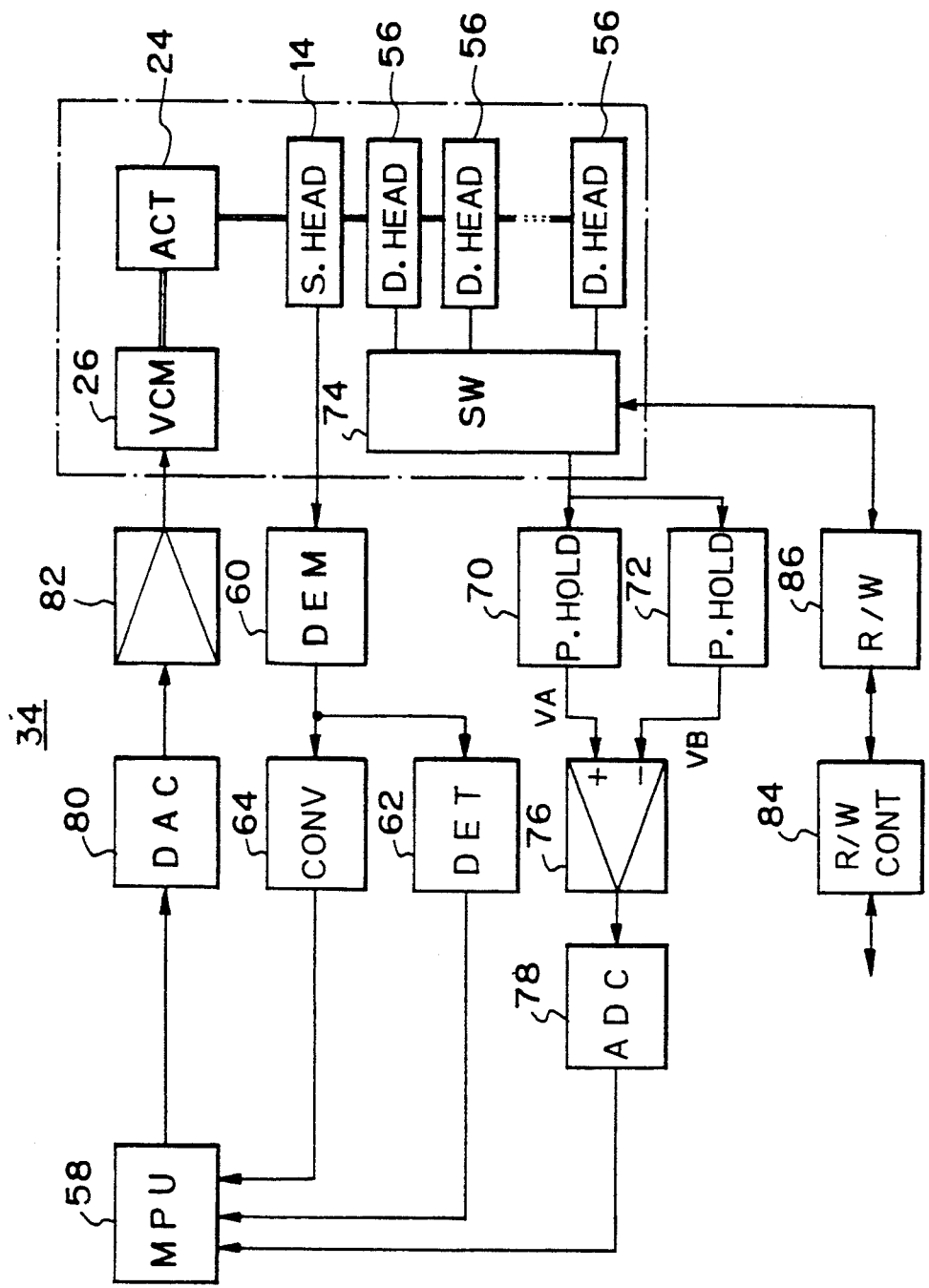
FIG. 8 is a block diagram showing a more detailed construction of the disk drive 34 of FIG. 7.

FIG. 8 is a block diagram showing a more detailed construction of the disk drive 34. The disk drive 34 comprises a microcomputer (hereinafter referred as MPU) 58 as a main control unit. Functions of other constituents are described below.

Figure 9:
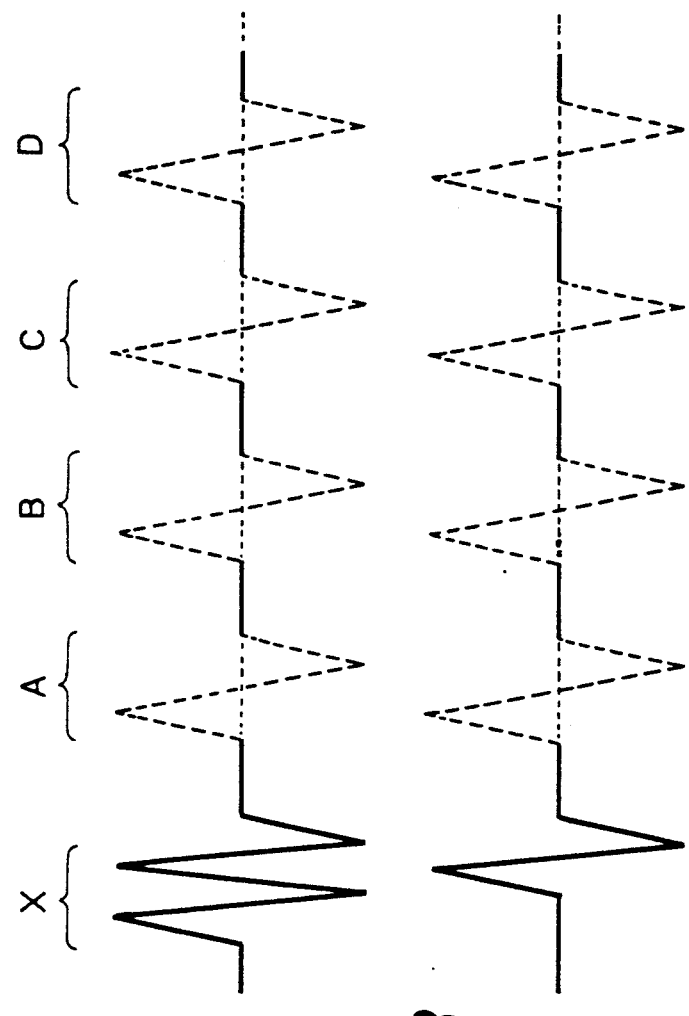
FIGS. 9A and 9B are waveform diagrams showing two signal patterns appearing in a signal from a servo head.

FIGS. 9A and 9B are waveform diagrams showing two-patterns of servo signals obtained in the servo head 14. Peaks shown in a region X are signals used for synchronization, and peaks appearing in regions A, B, C and D are signals indicating a position of the servo head 14.

The signal pattern shown in FIG. 9A has two positive peaks in the region X. This signal pattern represents a value "1". The signal pattern shown in FIG. 9B has one positive peak in region X. This signal pattern lot, represents a value "0". While the servo head 14 is located on the IGB1, sequences of five patterns "01010" repeatedly appear in constant intervals, and while the servo head 14 is located on the IGB2, sequences of five patterns "01110" repeatedly appear in constant intervals.

A servo demodulator 60 synchronizes the signal of the servo head 14 and detects the value "0" or "1" from the signal of the servo head 14. A guard band detector 62 detects the IGB1 and IGB2 by detecting the above sequence from outputs of the servo demodulator 60.

The servo demodulator 60 also detects peak height a, b, c and d of the peaks in the regions A, B, C and D, respectively, and outputs signals POSN and POSQ to a signal converter 64, wherein POSN=b−a and POSQ=d−c.

Figure 10:
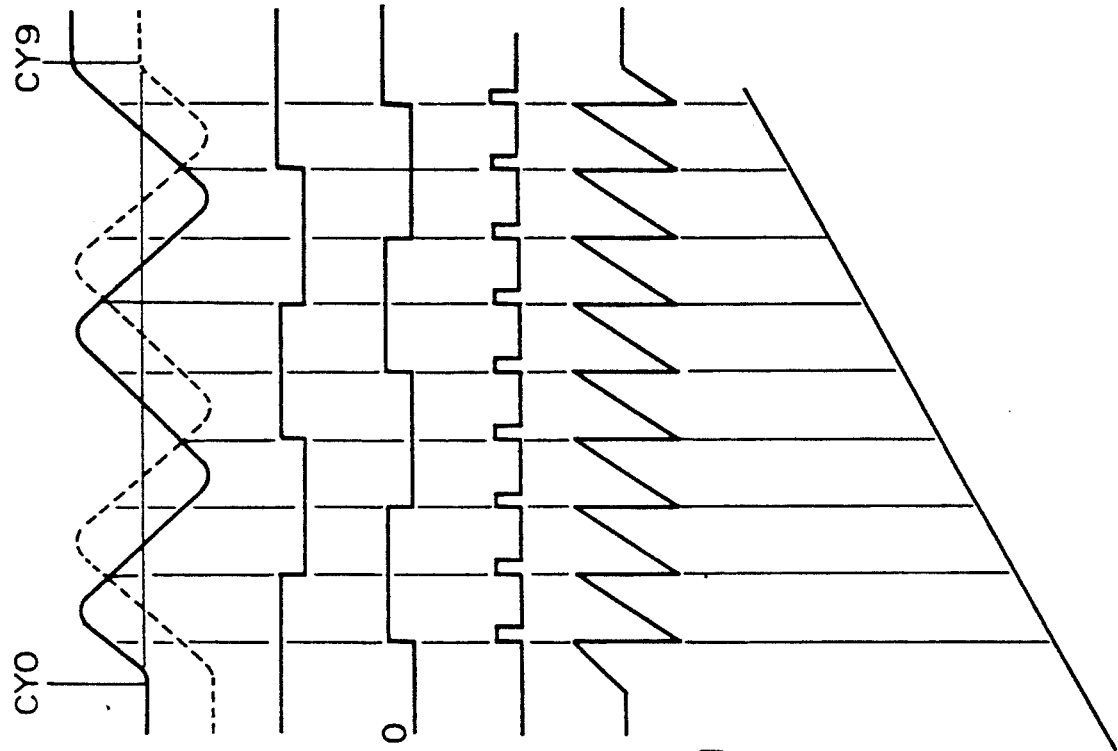
FIGS. 10A to 10D are waveform diagrams showing various signals for deriving position data.
FIGS. 10E and 10F are diagrams explaining the position data.

The POSN and POSQ are also obtained in the servo zone 12 (FIG. 1) where only the signal pattern shown in FIG. 9A appears. While the servo head 14 is moved across the tracks, the POSN and POSQ vary as shown in FIG. 10A. An N>Q signal is obtained by comparing the POSN with POSQ, and an (N+Q)>O signal is obtained by adding POSN to POSQ and by comparing the same with a zero level, as shown in FIG. 10B and 10C. A track crossing pulse TXPL shown in FIG. 10D is obtained at the edges of the two signals. The signal converter 64 converts the POSN and POSQ into the two signals N>Q and (N+Q)>O and track crossing pulse TXPL in accordance with the above method, and outputs these digital signals to the MPU 58. In addition, the signal converter 64 converts the analog POSN and POSQ into digital values, and outputs these digital signals to the MPU 58.

The MPU 58 calculates position data of FIG. 10E and FIG. 1OF by using the digital POSQ if the N>Q signal and the (N+Q)>O signal are at a high level, by using inverted digital POSN if the N>Q signal is at a low level and the (N+Q)>O signal is at a high level, by using inverted digital POSQ if the N>Q signal and the (N+Q)>O signal are at a low level, and by using the digital POSN if the N>Q lo signal is at a high level and the (N+Q)>O signal is at a low level.

Figure 11:
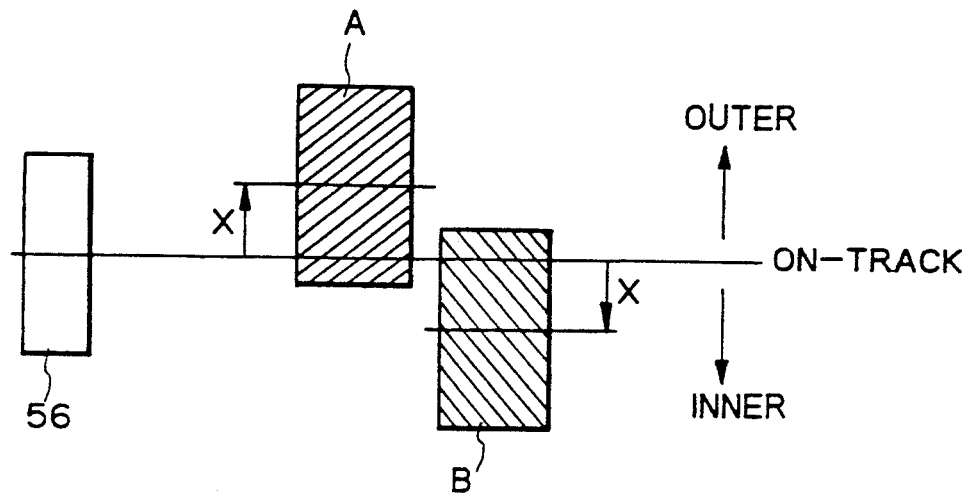
FIG. 11 is a diagram showing servo information for correcting the position data.

Since the magnetic disk having the servo face 10 and the other magnetic disk having the data face are fixed on a common rotation axis as shown in FIG. 6 and 7, position control of the data heads 56 (FIG. 7) is attained using the position data obtained from the servo head 14. In addition, in order to correct a slight offset caused by the difference in thermal expansion of the magnetic disks, servo information A and B is recorded in predetermined PoBitions of predetermined data tracks as shown in FIG. 11. The servo information A is recorded in the outer portion of A represented by X from an on-track position, and the servo information B is recorded in the inner position of B represented by X from the on-track position.

Figure 12:
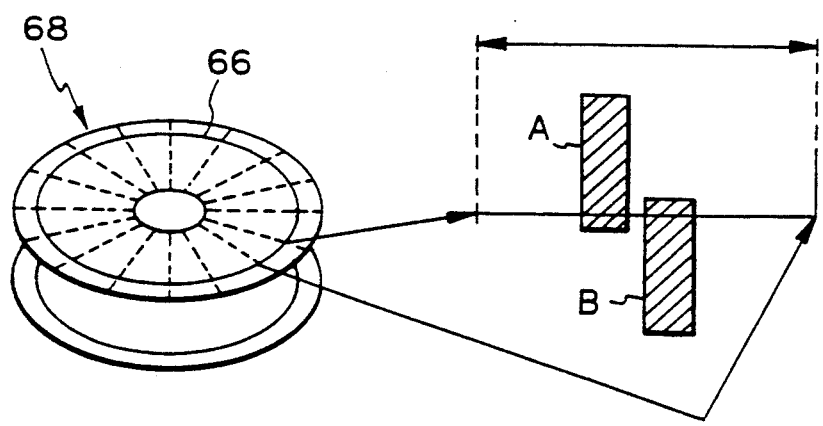
FIG. 12 is a diagram showing an example of recording the servo information for correcting.
Figure 13:
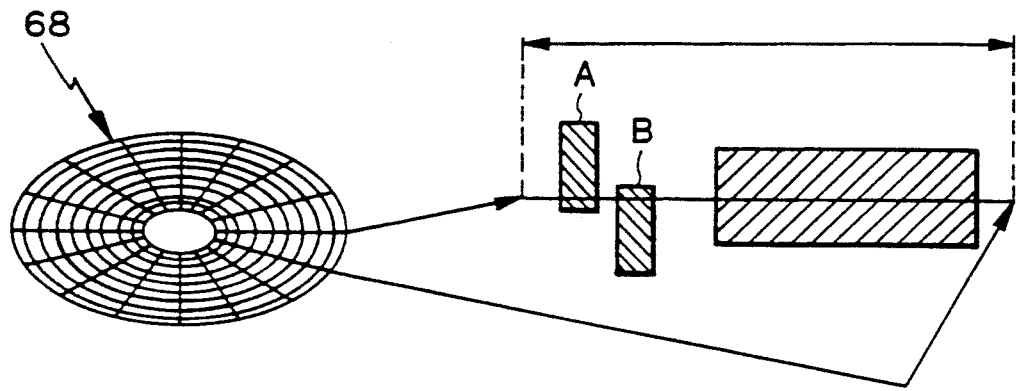
FIG. 13 is a diagram showing another example of recording the servo information.

The servo information is recorded in a specific track 66 of the data faces 68 as shown in FIG. 12, or is recorded in all tracks as shown in FIG. 13.

Figure 14:
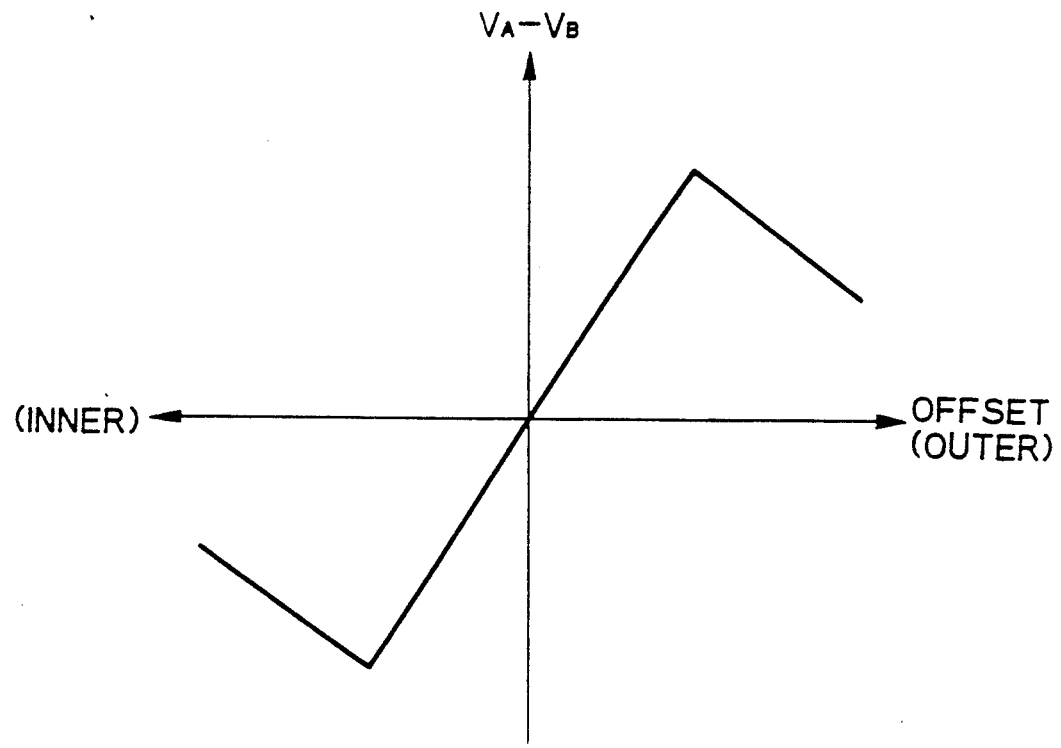
FIG. 14 is a graph showing the relationship between signal derived from the servo information and an offset of a track.

Referring to FIG. 8, a peak hold circuit 70 holds a peak voltage $V_A$ in an interval of the information A in the signal from the data head 56 selected by a head switching circuit 74, and a peak hold circuit 72 holds a peak voltage $V_B$ in an interval of the information B. A differential amplifier 76 outputs a voltage $V_A$-$V_B$, and the A/D converter outputs a digital value of the ($V_A$-$V_B$) to the MPU 58. As shown in FIG. 14, the value $V_A$-$V_B$ is proportional to the offset of the head position with a constant proportional gain. The MPU 58 stores the offset values calculated from the digital $V_A$-$V_B$ and corrects the position data of FIG. 10E or FIG. 10F.

In a position control mode, the MPU 58 calculates corrected position data from the stored offset and the position data of FIG. 10E or FIG. 10F, and calculates a value of a manipulated variable for the VCM 26 by multiplying the corrected position data by a proportional gain. The value of the manipulated variable is converted into analog voltage in a D/A converter 80, is amplified in a servo amplifier 82, and is applied to the VCM 26.

In a speed control mode, the MPU 58 obtains an observed value of the speed of the head, for example, by calculating the rate of change in the position data of FIG. 10F. The MPU 58 calculates the difference between a target speed and the observed speed, calculates a value of a manipulated variable by multiplying the difference by a proportional gain, and outputs the value of the manipulated variable to the D/A converter 80.

A read and write operation for the data head 56 selected by the head switching circuit 74 is performed through a read/write control circuit 84 and a read/write circuit 86.

Figure 15A:
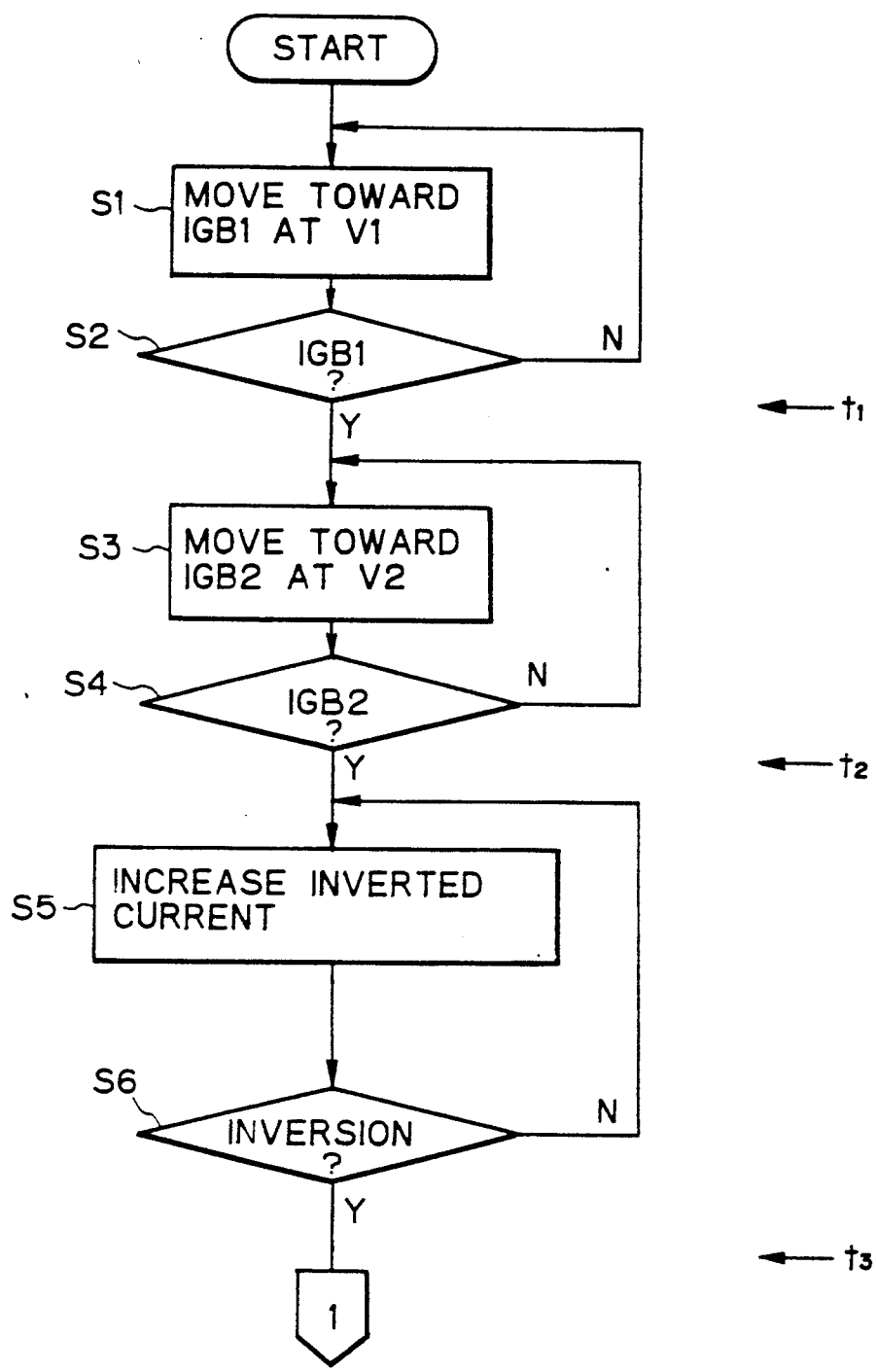
FIGS. 15A and 15B are flow charts showing a head positioning process according to an embodiment of the present invention.
Figure 15B:
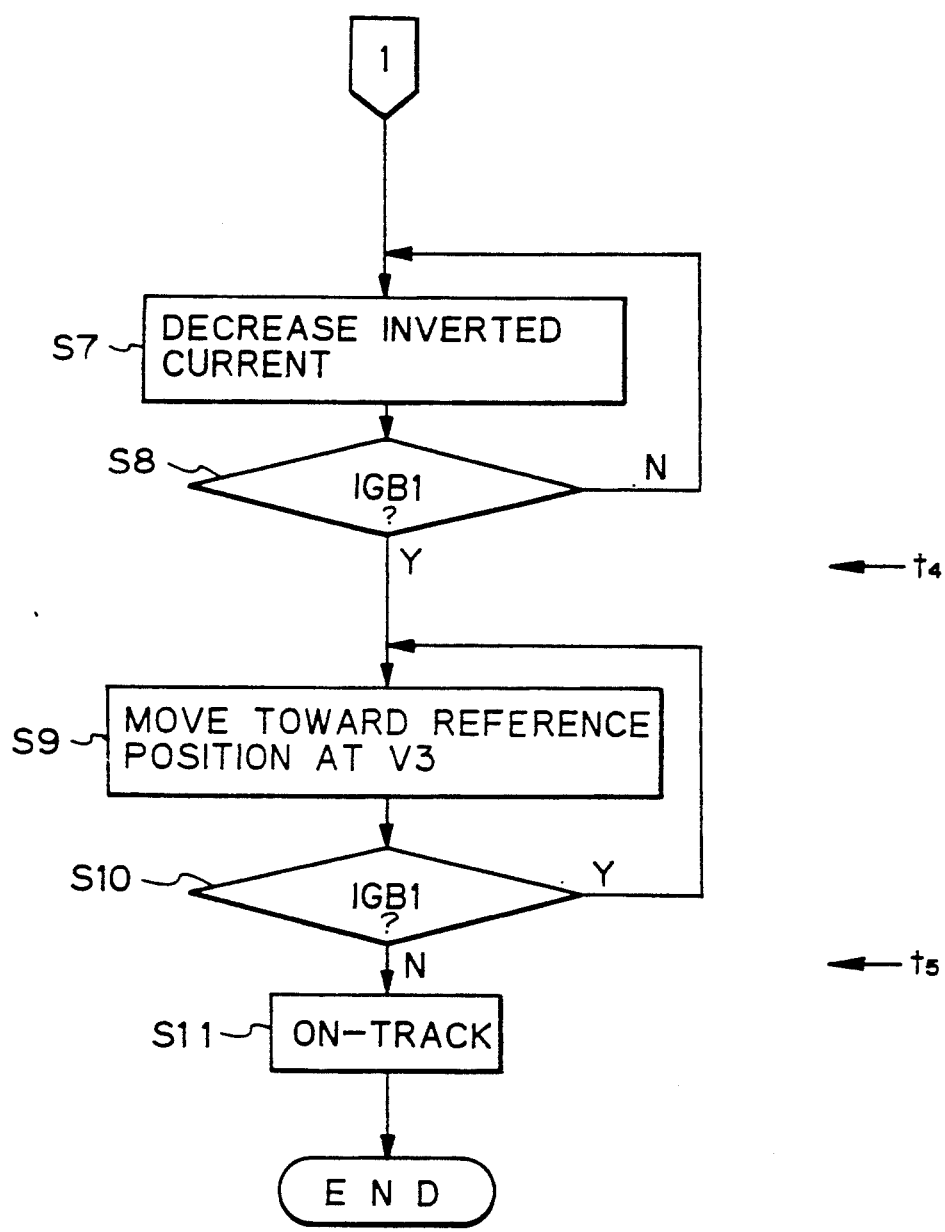

FIGS. 15A and 15B are flowcharts showing a head positioning method according to an embodiment of the present invention. The process shown in FIGS. 15A and 15B is attained in the MPU 58.

In step S1 of FIG. 15A, the head 14 is moved toward the IGB1 at speed V1 under the speed control mode. During the movement, in step S2, it is determined whether or not the guard band area IGB1 is detected by examining the output of the guard band detector 62. If the IGB1 is detected, in step S3, the target speed is switched to V2, which is lower than V1, and the head is further moved toward the IGB2.

In step S4, if the IGB2 is detected the process is advanced to step S5. In step S5, an inverted drive current is fed to the VCM 26, and the inverted drive current is gradually increased until an inversion of a direction of movement of the head is detected in step S6. The inversion of the head is detected by detecting an inversion of a gradient of the position data of the FIG. 10F.

If the inversion of the head is detected in step S6, the process is advanced to step S7 of FIG. 15B. In step S7, the inverted current is gradually decreased. If the IGB1 is detected in step S8, in step S9, the head 14 is moved toward the reference position on the reference track 16 at speed V3 under the speed control mode, until the IGB1 is not detected in step S10. If the IGB1 is not detected, the control mode is switched to the position control mode to position the head 14 on the reference track 16.

In the above mentioned head positioning process according to the present invention, the inverted drive current is gradually increased until the inversion of the head is detected. Therefore, neither too much nor too little inversion torque is applied to the head actuator 19 even though an external force acting on the head actuator 19 varies.

FIGS. 16A and 16B show a variation in the position data of FIGS. 10E and 10F, respectively, in the head positioning process. The inversion of the direction of movement of the head can be detected by examining the sign of the gradient of the position data of FIG. 16B. FIG. 17 shows a locus of the head and FIG. 18 shows a variation of the drive current in the head positioning process of the present invention.

Although the aforementioned embodiment is described with regard to the magnetic disk having the reference track and the guard band areas on the inside of the disk, the present invention may also be applicable to the magnetic disk having the reference track and the guard band areas on the outside of the disk.

We claim:

1. A method of positioning a head on a reference track of a disk medium having a first guard band behind the reference track and having a second guard band behind the first guard band, the head being movable by feeding a drive current to a driving motor for the head, comprising the steps of:
   i) moving the head toward the first guard band at a first speed until the first guard band is detected;
   ii) moving the head toward the second guard band at a second speed lower than the first speed until the second guard band is detected;
   iii) feeding an inverted drive current to the driving motor until an inversion of a direction of movement of the head is detected;
   iv) moving the head toward the reference track at a third speed, until the first guard band is not detected; and
   v) positioning the head on the reference track.

2. A method as claimed in claim 1, wherein the inverted drive current is gradually increased in said step (iii).

3. A method as claimed in claim 2, further comprising the step of:
   vi) feeding a gradually decreased inverted drive current to the driving motor until the first guard band is detected after said step (iii) and before said step (iv).

4. An apparatus for positioning a head on a reference track of a disk medium having a first guard band behind the reference track and having a second guard band behind the first guard band, the head being movable by feeding a drive current to a driving motor for the head, comprising:
   guard band detecting means for detecting the first guard band and the second guard band;
   direction detecting means for detecting a direction of movement of the head; and
   control means for moving the head toward the first guard band at a first speed until the guard band detecting means detects the first guard band, moving the head toward the second guard band at a second speed lower than the first speed until the guard band detecting means detects the second guard band, feeding an inverted drive current to the driving motor until the direction detecting means detects an inversion of the direction of the movement of the head, moving the head toward the reference track at a third speed until the guard band detecting means odes not detect the first guard band, and positioning the head on the reference track.

5. An apparatus as claimed in claim 4, wherein the control means feeds a gradually increased inverted drive current to the driving motor until the direction detecting means detects an inversion of the direction of the movement of the head.

6. An apparatus as claimed in claim 5, wherein the control means feeds a gradually decreased inverted current until the guard band detecting means detects the first guard band after feeding the gradually increased inverted drive current and before moving the head toward the reference track at the third speed.

7. A method for positioning a head on a disk medium having a reference track and first and second guard bands, the first guard band being inside and concentric with the reference track, and the second guard band being inside and concentric with the first guard band, comprising the steps of:
   a) moving the head from a position outside of the reference track in a first direction toward the first guard band at a first speed;
   b) detecting the first guard band;
   c) moving the head in the first direction at a second speed less than the first speed, toward the second guard band, based on said step (b);
   d) detecting the second guard band;
   e) driving the head in a second direction opposite to the first direction, based on said step (d);
   f) detecting an inversion in movement direction of the head from the first direction to the second direction;
   g) terminating said step (e), based on said step (f);
   h) moving the head toward the reference track in the second direction at a third speed; and
   i) positioning the head at the reference track.

8. A method as claimed in claim 7, wherein said step (f) includes the substeps of:
   f1) detecting a position data signal using the head;
   f2) calculating a gradient of the position data signal; and
   f3) monitoring the gradient calculated in said substep (f2) for a sign change indicating the inversion of the movement direction of the head from the first direction to the second direction.

* * * * *

UNITED STATES PATENT AND TRADEMARK OFFICE
CERTIFICATE OF CORRECTION

PATENT NO. : 5,315,458
DATED : May 24, 1994
INVENTOR(S) : Atsushi SATO et al.

It is certified that error appears in the above-identified patent and that said Letters Patent is hereby corrected as shown below:

Column 2, line 33, delete ".".

Column 5, line 6, delete "lot,";

line 56, change "PoBitions"

to --positions--.

Signed and Sealed this

Sixteenth Day of August, 1994

Attest:

BRUCE LEHMAN

Attesting Officer    Commissioner of Patents and Trademarks